UNITED STATES PATENT OFFICE.

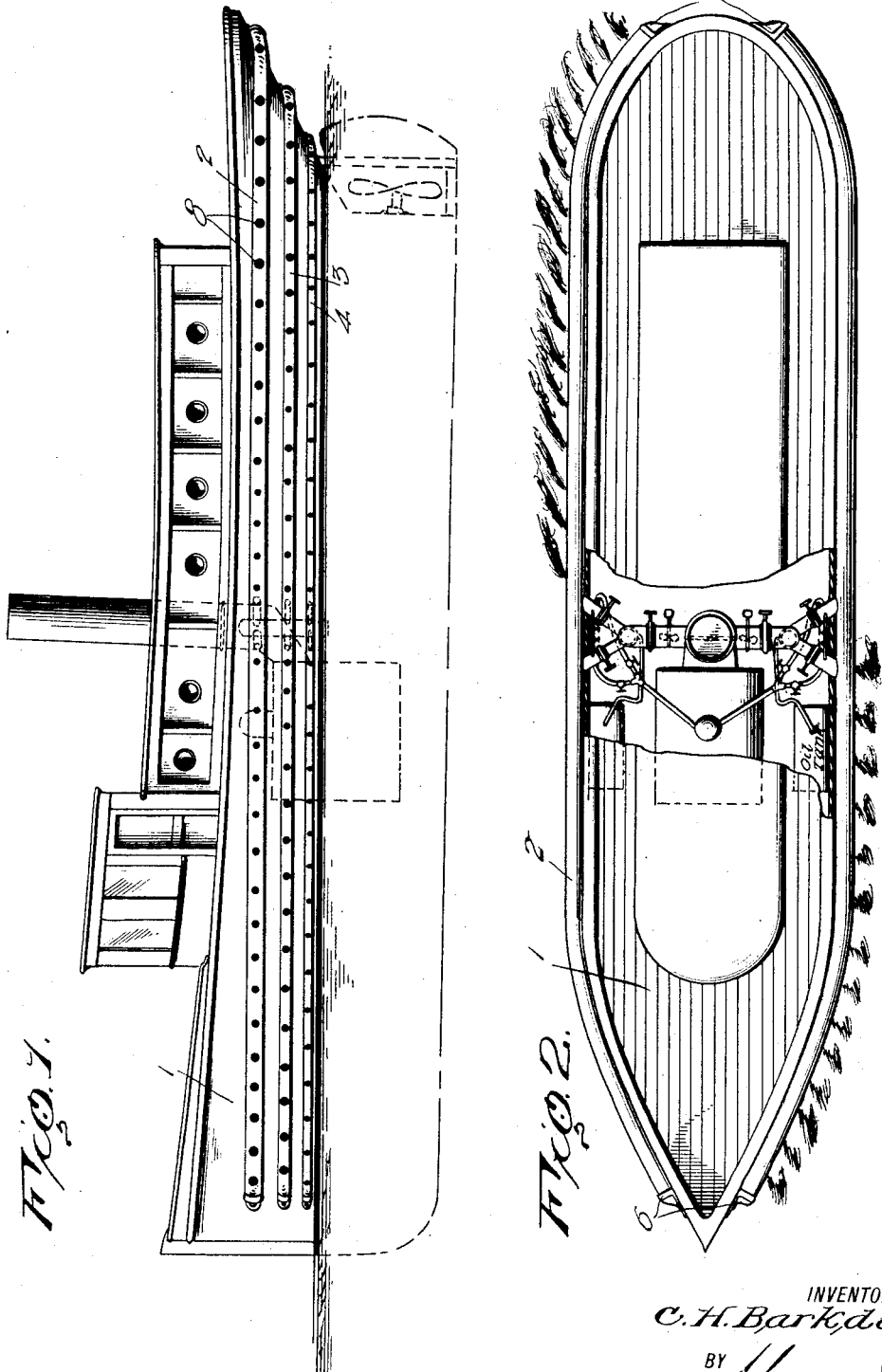

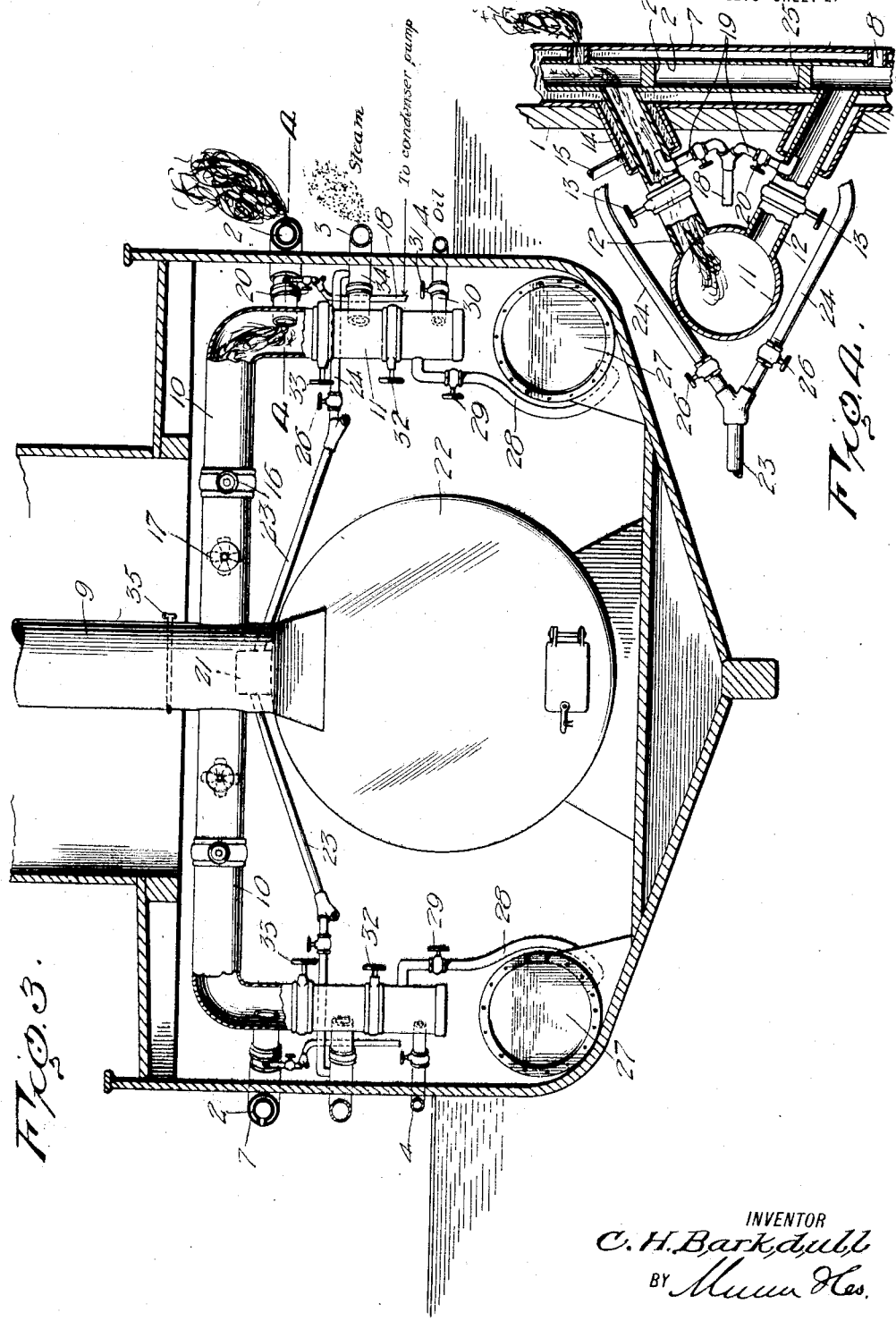

CALVIN H. BARKDULL, OF SEATTLE, WASHINGTON.

SYSTEM OF CAMOUFLAGE.

1,301,087.     Specification of Letters Patent.     Patented Apr. 22, 1919.

Application filed July 19, 1918. Serial No. 245,664.

*To all whom it may concern:*

Be it known that I, CALVIN H. BARKDULL, a citizen of the United States, and a resident of Seattle, in the county of King and State of Washington, have invented certain new and useful Improvements in Systems of Camouflage, of which the following is a specification.

My invention is an improvement in systems of camouflage, and has for its object to provide a system of the character specified adapted for use with vessels, fortifications of all characters, aeroplanes, tanks and the like, wherein means is provided for discharging oil, smoke, steam, chemicals or the like from the sides of the vessel, to conceal the same or for any other purpose, as, for instance, to keep the sides of the vessel clear from ice, for cooling the vessel or for quieting the waves by the discharge of oil.

In the drawings:

Figure 1 is a side view of a vessel provided with the improved system;

Fig. 2 is a top plan view, with parts broken away;

Fig. 3 is a transverse vertical section;

Fig. 4 is a section on the line 4—4 of Fig. 2.

The present embodiment of the invention is shown in connection with a vessel 1 of conventional type, and the improvement comprises a series of pipes arranged upon each side of the vessel, in the present instance three series of pipes being provided at each side.

In each series there is a large pipe 2, an intermediate pipe 3 and a small pipe 4, the pipes being arranged in spaced approximately parallel relation, with the pipe 4 near the water's edge, while the pipe 2 is near the deck level. Each of these pipes has openings or perforations in its outer side, and through these openings is adapted to be discharged oil, smoke, steam or any other desired material.

The pipes 2 are more especially adapted for the discharge of smoke, the pipes 3 for the discharge of steam, and the pipes 4 for the discharge of oil, and it will be noticed that the ends of all the pipes are closed, as indicated at 6, at both their front and rear ends, and that the said pipes extend to near the stern and near the bow.

The pipes 2, as shown more especially in Figs. 3 and 4, are jacketed, each pipe having a jacket 7 inclosing the same, and passages 8 are provided at the outer sides of the pipes, leading from the pipes to the jacket and opening through the jacket, to permit the smoke to be discharged from the pipe 2 to the open air. At approximately the center of the pipe 2 there is provided a connection between the said pipes and the smoke stack 9 of the furnace. This connection is a pipe 10 leading from the stack outwardly toward the side of the vessel, and each pipe has a depending portion 11 adjacent to the vessel wall.

Other pipes 12 diverge from the portion 11 of the pipe 10 at the level of the pipes 2, and extend through the wall of the vessel and through the wall of the jacket 7 to a connection with the pipes 2. A valve 13 is arranged in each pipe 12 for controlling the same, and there is an extension 14 of the jacket 7 about that portion of each pipe 12 adjacent to the pipe 2, the said extensions passing through the vessel wall.

Each of these extensions 14 has connected therewith a water pipe 15, by means of which the pipes 2 may be cooled, the water flowing through the extensions and through the jackets to cool the same to prevent injury to the vessel wall. Valves 16 are arranged in the pipes 10, between the stack and the pipes 12, and a fan 17 is arranged in each of the said pipes between the valve and the stack.

A pipe 18 extends from the condenser pump to near the pipes 12, where the said pipe branches and the branches 19 open into the pipes 12 at the extensions 14. A valve 20 is arranged in each of the branches for controlling the same.

The pipes 3 are supplied with steam from the dome 21 of one of the boilers 22 by means of pipes 23 which extend laterally and forwardly from the dome toward the vessel wall. Each of these pipes 23 branches at the depending portion 11 of the pipe 10, and each branch 24 is connected with the adjacent pipe 3.

Referring to Fig. 4 it will be noticed that partitions 25 are arranged in the pipe 2 at the openings of the pipes 12, the said partitions being arranged on the inner sides of the said openings, so that the smoke must flow toward each end of the pipe 2. The same arrangement obtains in the pipe 3 between the branches 24, and each branch 24 has a valve 26 for controlling the same. The pipes 3 and 4 have openings or perforations, as shown in Fig. 1, extending the full length thereof and arranged in spaced relation, and corresponding in spacing approximately to the spacing of the openings 8 in the pipes 2. The pipes 4 are supplied with oil from tanks 27 arranged at each wall of the vessel, and the oil is supplied by means of pipes 28 which extend upwardly and open into the lower ends of the depending portions 11 of the pipes 10.

A valve 29 is interposed in each pipe 28 and pipes 30 lead from the lower ends of the depending portions 11 to the pipes 4, the arrangement being the same as that of the pipes 12. Each of the pipes 30 is controlled by a valve 31 and valves 32 and 33 are arranged in the depending portion 11 of each pipe 10 for closing the said pipe. The valve 32 is between the pipes 30 and the branches 24 of the pipes 23, while the valve 33 is between the branches 24 of the pipe 23 and the pipes 12.

With this arrangement, when it is desired to distribute oil alone the valves 32 are closed and the valves 29 are opened. When it is desired to distribute steam the valves 32 and 33 are closed and the valves 26 are opened. It will be noticed from an inspection of Fig. 3 that the pipes 3 communicate with the depending portions 11 of the pipes 10 by pipes 34 and that the branches 24 open into these pipes 34. When it is desired to use steam alone in the pipes 3 the valves 32 and 33 are closed, and the valve 26 is opened. When it is desired to use steam only the valve 33 is closed and the valves 16 are opened.

Smoke may be discharged from all of the pipes when desired by opening the valves 32 and 33 and closing the remaining valves, or, if desired, smoke may be discharged from the pipes 2 and 3 only. Smoke, steam and oil may be discharged simultaneously and by closing the valves 32 and 33 and opening the valves 29, 31 and 26.

With slight changes it will be obvious that the device might be arranged to discharge water or chemicals in solution, gas or the like. The device might with equal facility be applied to the walls of a fortress, an airship, or a tank.

In vessels, by the use of steam, the sides of the vessel can be kept free from ice and by the use of refrigerated air the entire vessel could be cooled in summer. The pipes also act as fenders, thereby strengthening and reinforcing the vessel, and since all of the pipes are above the water line they cannot retard the speed of the vessel. The system can be attached to any vessel, old or new, at a nominal cost and in a very short time.

With a vessel, while traveling, the smoke from the furnace may be forced through the pipes, and the vessel will travel in a screen of smoke that will thoroughly hide and protect the same. This screen may be thickened by the use of steam, if desired. In running away from an enemy vessel the rear of the vessel might be screened by a smoke cloud, while the front will be kept clear by closing that valve 13 toward the bow. Thus the smoke would only flow into the rear parts of the pipes 2. On the other hand, were it desired to obscure the entire ship while leaving clear vision ahead, the valves 13 toward the bow would be closed, leaving the smoke to flow from the rear portions of the pipes 2, while steam or water under heavy pressure would be forced through the forward ends of the pipe 3. It will be noticed that a damper 35 is arranged in the smoke stack just above the pipes 10 so that all of the draft can be forced through the pipes 10.

It will be understood that the pipes 2 are jacketed on the side next to the vessel only.

I claim:

1. A system of the character specified, comprising in combination with a vessel, of a series of pipes extending longitudinally of the same at each side thereof and having perforations at their outer sides, said pipes gradually decreasing in diameter from above downward, a pipe extending from the smoke stack laterally toward each series of pipes and having a depending portion adjacent to the said series, a plurality of communications between each pipe of the series and its adjacent depending portion, a partition in each pipe between the communications, a valve in each communication, and means for supplying steam to the depending portion at the intermediate pipe, means for supplying oil to the depending portion at the lowest pipe and means for controlling each of the said supplying means.

2. A system of the character specified, comprising in combination with a vessel, of a series of pipes extending longitudinally of the same at each side thereof and having perforations at their outer sides, a pipe extending from the smoke stack laterally toward each series of pipes and having a depending portion adjacent to the said series, a plurality of communications between each pipe of the series and its adjacent depending portion, a partition between the communications of each pipe, a valve in each communication, means for supplying steam to the depending portion at the intermediate pipe, means for supplying oil to the depending portion at the lowest pipe, and means for controlling each of the said supplying means.

3. A system of the character specified, comprising in combination with a vessel, a series of pipes extending longitudinally of the same at the opposite sides thereof and having perforations at their outer sides, means for connecting either or all of said pipes with the smoke stack, means for shutting off either of said pipes from the smoke stack, means for supplying steam to certain of the pipes, means for supplying oil to others of the pipes, the pipes at each side of the vessel having partitions at their centers and the connections with the smoke stack, steam and oil supplies being double and upon opposite sides of the partition and valve controlled for the purpose specified.

4. A system of the character specified, comprising in combination with a vessel, a series of pipes extending longitudinally of the same at the opposite sides thereof and having perforations at their outer sides, means for connecting either or all of said pipes with the smoke stack, means for shutting off either of said pipes from the smoke stack, means for supplying steam to certain of the pipes, and means for supplying oil to others of the pipes.

5. A system of the character specified comprising in combination with a vessel, a series of pipes extending longitudinally of the same at opposite sides thereof and having perforations at their outer sides, means for connecting either or all of said pipes with the smoke stack, means for shutting off either of said pipes from the smoke stack, and means for supplying steam to certain of the pipes.

6. Apparatus for screening a vessel from observation, comprising pipes extending longitudinally of the vessel and having discharge openings at their outer sides, and means for supplying smoke, steam and oil to the said pipes, said means being controllable to permit the smoke, steam and oil to be supplied to the pipes together or independently.

7. Apparatus for screening a vessel from observation, comprising a series of pipes extending longitudinally of the vessel and having discharge openings opening away from the vessel, means for supplying steam and oil to sundry of the pipes, and means for supplying smoke to any or all of the pipes.

CALVIN H. BARKDULL.

Witnesses:
JOHN WESLEY DOLBY,
E. LIEBERSON.

Copies of this patent may be obtained for five cents each, by addressing the "Commissioner of Patents, Washington, D. C."